Dec. 21, 1926.  1,611,482
E. C. MYERS
CULTIVATOR ATTACHMENT FOR TRACTORS
Original Filed March 9, 1920   2 Sheets-Sheet 1
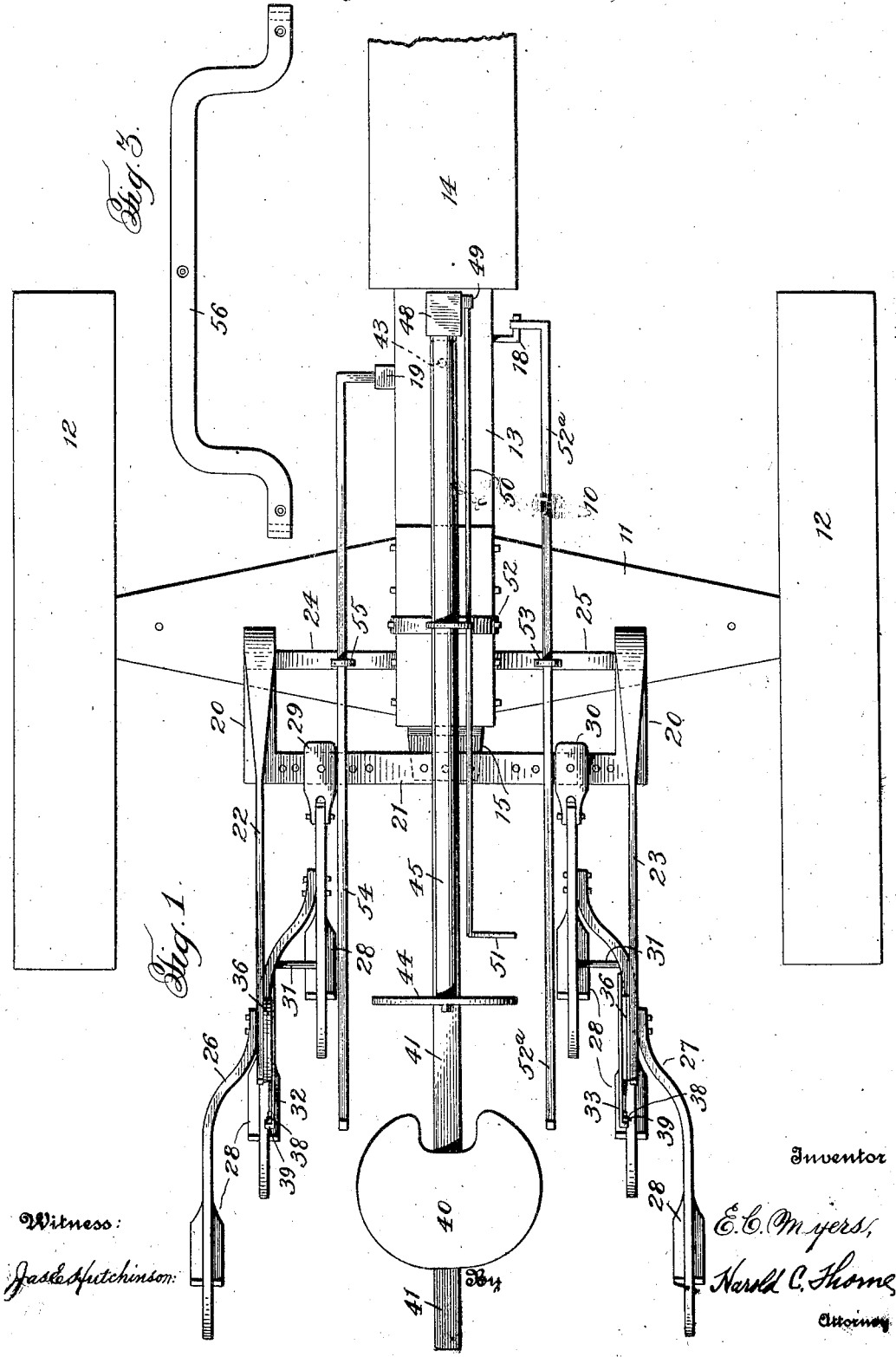

Dec. 21, 1926.
E. C. MYERS
1,611,482
CULTIVATOR ATTACHMENT FOR TRACTORS
Original Filed March 9, 1920   2 Sheets-Sheet 2
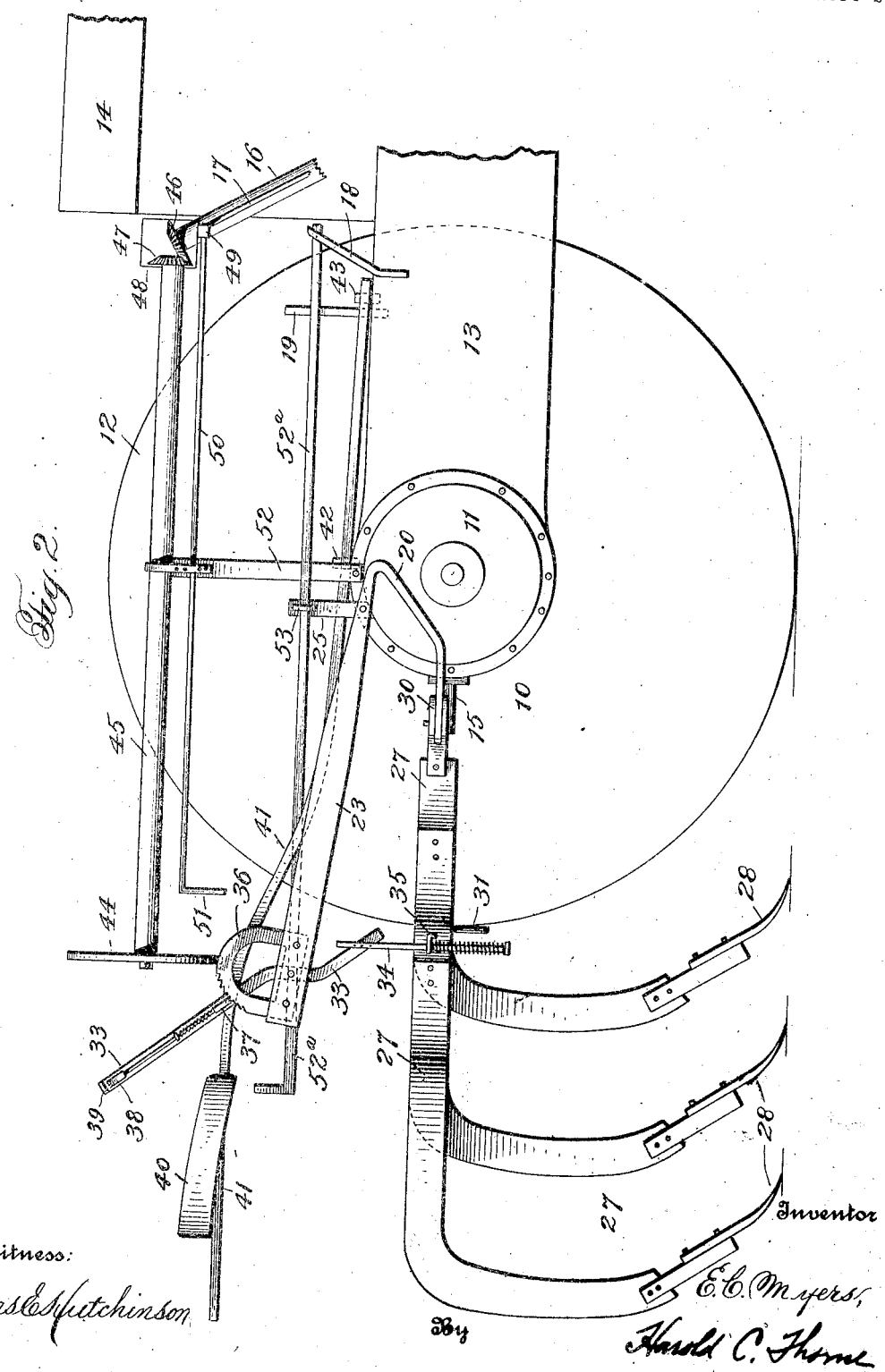

Patented Dec. 21, 1926.

1,611,482

UNITED STATES PATENT OFFICE.

EDWARD C. MYERS, OF SEATTLE, WASHINGTON.

CULTIVATOR ATTACHMENT FOR TRACTORS.

Application filed March 9, 1920, Serial No. 364,514. Renewed June 30, 1926.

This invention relates to cultivator attachments for tractors, and primarily to attachments which are adaptable to the small types of gas tractors, and so designed as to be attached to the tractor, practically forming a part of it.

An object of the invention is to provide cultivator and controlling attachments for the tractor for positioning the driver, in the proper place, over the cultivator, where he can guide and operate the cultivator shovels with his feet.

Another object of the invention is to provide attachments for the tractor which can be readily fastened to it in such a manner that the parts are substantially supported and carried by the tractor, without any material alteration of the tractor parts.

A further object of the invention is to provide a cultivator and accessories which can be entirely supported on the tractor drawbar and differential housing.

A further object of the invention is to provide simple and substantial attachments for extending the tractor driving and steering mechanisms back where they will be accessible to the driver seated over the cultivator Further objects and details of the invention will appear as described in connection with the accompanying drawings, and hereinafter set forth and claimed.

In the drawings illustrating the invention:

Figure 1 is a plan view showing the rear end of a tractor having cultivator attachments connected therewith, Figure 2 is a side elevation of the same, and Figure 3 is an elevation of a detail.

The tractor, parts of which are shown in the drawings, represents one of the small types of tractors propelled by an internal combustion engine, and is designated generally by the reference numeral 10. The rear axle and differential housing 11 extends between the wheels 12 of the tractor, and the transmission casing 13 extends forwardly from the differential housing to the engine, front wheels, etc., (not shown). The fuel tank is shown at 14; drawbar on the rear of the differential housing 15; steering column, 16; throttle control, 17; clutch release, 18; and gear shift 19.

The plow beam and frame member 20. is adapted to be bolted or otherwise fastened to the tractor drawbar 15. It comprises a yoke section 21, with upwardly extending supporting members 22, and 23, upon which controlling mechanism, hereinafter referred to, is mounted. Additional supports, 24 and 25, for the frame members are fastened to the differential housing by securing it with one of the bolts which holds this housing together as shown.

Cultivators, 26 and 27, comprising drag bars, each carrying a series of cultivator shovels 28, may be attached to the plow beam 21, by means of two way clevises, 29 and 30. These clevises have pivotal connections with the plow beam which permit them to swing in and out whereby they may be moved horizontally, and the drag bars of the cultivators are also pivotally connected with them in a manner allowing vertical movement for raising and lowering the cultivators. The cultivators are shown provided with stirrups 31, so that the operator, seated over them, may guide them with his feet.

Positioned on the outer ends of the supporting members, 22 and 23, are operating levers, 32 and 33, for adjusting the drag bars of the cultivators so they can be raised or lowered. As best shown in Figure 2, lever 33, is pivotally mounted on the supporting member 23; its lower end is connected with a link 34, which has a spring supporting connection 35 with the drag bar 27. A ratchet segment 36, is mounted on the supporting member 23, and a spring pressed pawl 37, on lever 33, cooperates therewith for holding the lever in its adjusted position. At the upper end of the lever are handles 38 and 39, for operating the lever as desired. Lever 32, on supporting member 22, is constructed in a similar manner.

The seat 40, which may be the original tractor seat, which had been mounted over the differential housing, is mounted in the proper position for the driver on a channel iron seat supporting bar 41. This bar is bolted to the differential housing at 42, and to the transmission and engine casing at 43.

The steering wheel, 44, may also be the original steering wheel removed from the top of the steering column 16, mounted on a supplemental steering rod 45, extending back so the driver can manage the wheel from his seat. A bevel gear 46, replaces the steering wheel on the steering column 16, and a second bevel gear 47, is positioned on the steering rod 45, and meshed with gear 46. A casing 48, forms a housing for these gears holding them in mesh, and forms a supporting bracket for the extension steering rod 45.

A casing, 49, is provided for the connection between the throttle control rod 17, and throttle extension rod 50, which has a handle 51, accessible to the driver. The connection between these throttle controlling rods may be a bevel gear drive within the casing 49, similar to the steering rod connections.

A support 52, for the supplemental steering rod 45, and throttle extension rod 50, is mounted on the differential housing in a similar manner as the supports 24 and 25, are, by one of the bolts for holding the housing together. By means of this support and the casings 48 and 49, these rods are secured in proper position for operation by the driver in seat 40.

In a similar manner the clutch release lever 18, is extended back by means of a rod 52ª, so as to be within reach of the driver for operating the clutch with either the foot or the hand. This rod is mounted in a guide 53, on support 25, midway of its length. An extension rod 54, is likewise provided for operating the gear shift from the driver's seat, and extends through a guide 55, on the support 24.

The embodiment of the invention herein disclosed is specifically a cultivator adapted for use with small plants, vegetables, etc., which the tractor will readily pass over. However, for cultivating where more clearance is needed, special rear wheels may be used and a front axle 56, having its ends bent downwardly to allow for clearance, may be substituted for the straight front axle; the steering connecting rod and radius rod are also bent to allow for clearance in the same manner.

This invention is not limited to the embodiment hereinbefore described, and shown in the drawings, for the purpose of giving examples or illustrations of the employment of the invention, for it will be obvious that wide departure from the above may be made without departing from the spirit and scope thereof which is as set forth in the following claims:

1. Attachments for a tractor whose engine and transmission casings and rear axle housings constitute its frame structure, comprising a supporting frame member having means for securing it to the rear axle housing of said tractor frame construction without altering the tractor frame construction so as to extend rearwardly of the tractor and to be entirely supported by said frame, working implements carried by said supporting frame member, and a seat attachment adapted to be secured to the tractor frame and provided with a seat in a position over said working implements.

2. Attachments for tractors comprising a supporting frame member having means for securing it to the rear axle and differential housing of the tractor without altering the frame construction thereof so as to extend rearwardly thereof and to be entirely supported by the tractor, working implements pivotally connected with said supporting frame member so as to extend to the rear of the tractor, and supported from said rearwardly extending supporting frame member, a seat attachment adapted to be secured to the tractor and provided with a seat in a position over said working implements, and attachments adapted to be connected with the steering and controlling mechanisms of the tractor for extending them to a position for operation from said seat.

3. Attachments for tractors comprising a draw bar having upwardly and rearwardly extending frame members at the ends thereof adapted to be attached to and supported from the rear end of the tractor, and working implements connected with the draw bar and supported from said rearwardly extending frame members.

4. Attachments for tractors comprising a horizontal member adapted to be secured to the rear end of a tractor, a supporting frame member extending upwardly and rearwardly from each end of said horizontal member, working implements connected with said horizontal member as a draw bar therefor, and supporting elements for connecting said implements with said supporting frames for carrying the implements from the frames.

5. A cultivator attachment having means for fastening it to the differential and rear axle housings of a tractor without altering the construction of said parts and so as to be entirely supported thereby, a cultivator member pivotally connected with each side of said attachment and adjustably supported therefrom, and means for raising and lowering the cultivator members with respect to the attachment independently of each other.

6. A cultivator attachment having means for fastening it to the differential and rear axle housings of a tractor without altering the construction of said parts and so as to be entirely supported thereby, cultivator members connected with the attachment and adjustably supported therefrom, and attachments adapted to be secured to the tractor for positioning the driver back over the cultivator members.

7. A cultivator attachment having means for fastening it to the differential and rear axle housing of a tractor without altering the construction of said parts and so as to be entirely supported thereby, a pair of cultivator members having pivotal connections with said attachment, means for supporting the cultivator members from said attachment, and means for raising and lowering said cultivator members with respect to the attachment and independently of each other.

8. A cultivator attachment for tractors comprising a horizontal draw bar and upwardly and rearwardly extending frame members, cultivator drag bars connected with said draw bar, levers adapted to be pivoted on said frame members and having means for holding them in any desired position, links connected with the lower end of the levers for supporting cultivators, and a yieldable member in the connections with the cultivators.

9. In combination with a tractor whose engine and transmission casings and rear axle housings constitute its frame, said tractor having a draw bar attachment secured to its rear axle housings, of working implements adapted to be fastened to the rear end and entirely supported by the tractor so as to extend rearwardly thereof, means for securing said implements conjointly from the draw bar attachment and said axle housings for holding them in said position, rods adapted to be connected with controlling devices of the tractor for extending them to a position over the implements, and brackets for supporting said rods substantially midway of their length having means for securing them to the frame of the tractor.

10. In combination with a tractor, operating implements adapted to be fastened to and supported by the tractor, a seat supporting member secured to the differential housing and transmission casing and extending from the tractor, and a seat mounted on said member in position over said implements.

11. A cultivator attachment including a supporting member comprising a horizontal draw bar having upwardly and rearwardly extending frame members at each end thereof, a pair of cultivator drag bars connected with said draw bar and extending below said frame members, and a lever on each frame member having a connection with one of said cultivator drag bars for raising and lowering it.

12. In combination with a tractor, a tool equipped frame secured to the rear end of the tractor so as to extend rearwardly thereof, a frame fastened to and extending rearwardly from the tractor over said tool equipped frame having controlling means thereon for adjustably supporting the rear end of said tool equipped frame, means adapted to be secured to the tractor for positioning the driver over said tool equipped frames, and means for extending the tractor steering and controlling appliances for operation from said position.

13. A supporting frame for attachment with tractors comprising a horizontal member adapted to be connected with the tractor draw bar, frame members extending upwardly from either side thereof from said horizontal member and rearwardly therefrom, and connecting members extending from said frame members adapted to be fastened to the tractor rear axle and differential casing for securing the frame members in a fixed position with respect to the tractor.

14. A frame attachment for tractors comprising a horizontal bar for attachment with the rear end of the tractor for connection with working implements, a pair of frame members having connections with the tractor and said bar, and supporting means on said frame members adapted to be connected with the working implements secured to said bar for supporting them.

15. A supporting frame for tractors comprising a horizontal member adapted to be connected with the rear end of the tractor as a draw bar, a pair of frame members connected with the horizontal member extending upwardly and rearwardly therefrom, connections between said frames and the tractor, and implement supporting lever members mounted on the rearward extensions of said frame members.

16. The combination with a tractor whose engine and transmission casings and rear axle housings constitute its frame structure of a frame secured to and extending from said tractor frame structure, operating implements carried by said frame, control devices for the operating implements secured on said frame, means for positioning the tractor driver over said implements where he can operate said control devices, and extended control devices for the tractor driving and steering appliances accessible from said position.

17. The combination with a tractor including a rear axle housing, differential casing and draw bar attachment, of an attachment therefor including a horizontal draw bar secured to the tractor draw bar attachment, a pair of frame members extending from the ends of said draw bar and secured to the rear axle housing and differential casing, a plurality of independently movable tool equipped frames pivotally connected with said draw bar, levers mounted on said frame members extending from the ends of the draw bar, and connections between said levers and the tool equipped frames for independently raising and lowering the rearwardly extending ends of said tool equipped frames.

18. In combination with the tractor set forth in claim 17, a seat supporting member secured to the tractor and extending rearwardly therefrom over said tool equipped frames, and a seat mounted on said member in a position over said implements.

19. In combination with the attachments for tractors as set forth in claim 18, control devices connected with the tractor driving and steering appliances and extending therefrom to the rear of the tractor where they will be accessible for the driver in the seat over the tool equipped frames.

20. Attachments for tractors comprising a draw bar having rearwardly extending frame members adapted to be attached to and supported from the rear end of the tractor, and working implements pivotally connected with the draw bar and supported from said rearwardly extending frame members.

21. A supporting frame for attachment with tractors comprising a horizontal member adapted to be connected with the tractor draw bar, and frame members fixedly secured to said horizontal member on either side of its connection with the tractor so as to extend rearwardly thereof.

22. The combination with a tractor including a rear axle housing and differential casing, of an attachment therefor including a horizontal bar secured to said rear axle and differential housings, a pair of tool equipped frames pivotally connected with said horizontal member so as to extend rearwardly thereof, a pair of frame members extending from the ends of said horizontal member, and means on said frame members for adjustably supporting said tool equipped frames.

23. The combination with a tractor of a frame secured to the rear end of the tractor to which tool equipped frames are connected and are adjustably supported, a second frame secured to the tractor and extending rearwardly thereof having a seat thereon in a position over the tool equipped frames carried by the first said frame member, and control devices having connections with the tractor control mechanisms extending rearwardly of the tractor for operation from said seat.

24. The combination with a tractor whose engine and transmission casings and rear axle and differential housings constitute its frame structure, of an implement carrying frame secured to the rear axle and differential housings of the tractor frame structure without altering their construction, an operating implement adjustably carried by said implement carrying frame, a control device for said operating implement mounted on said implement carrying frame, means for positioning the tractor driver over said implement where he can operate said control device, and control devices for the tractor driving and steering mechanisms extended to a position over said operating implement where they will be accessible for operation by the tractor driver in said position.

In testimony whereof I affix my signature.

EDWARD C. MYERS.